United States Patent Office 3,276,469
Patented Oct. 4, 1966

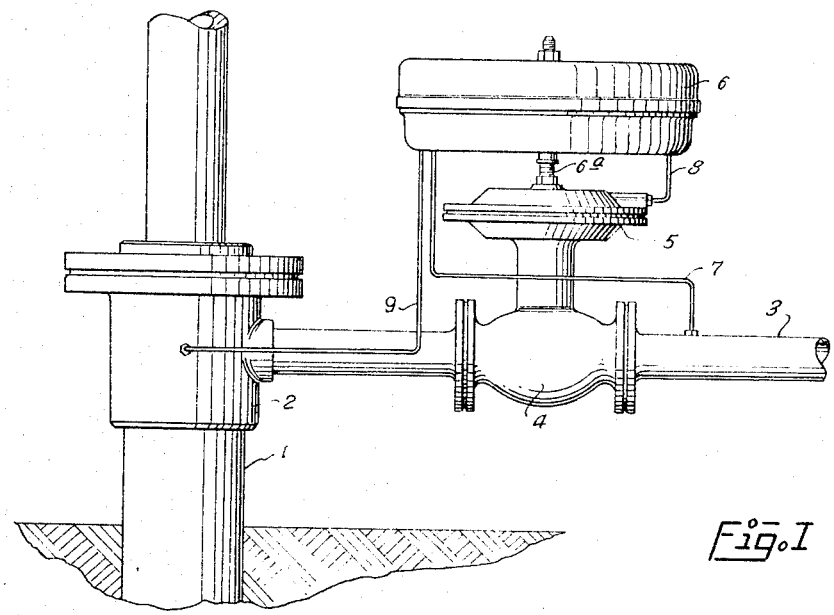
Fig. I
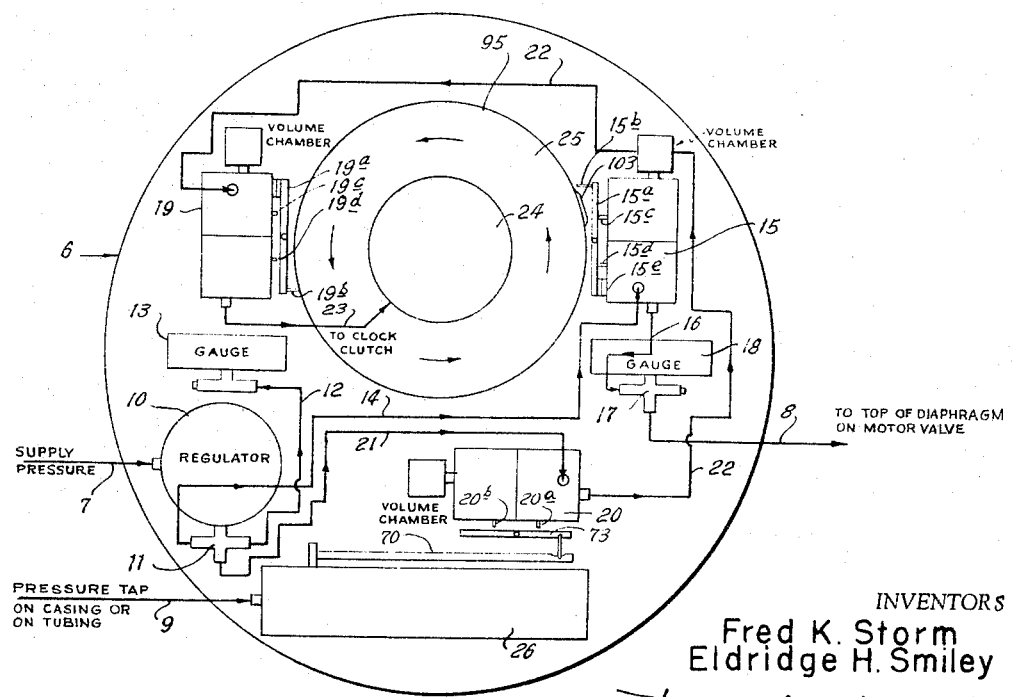
Fig. II
INVENTORS
Fred K. Storm
Eldridge H. Smiley
BY Howard E. Moore
ATTORNEY

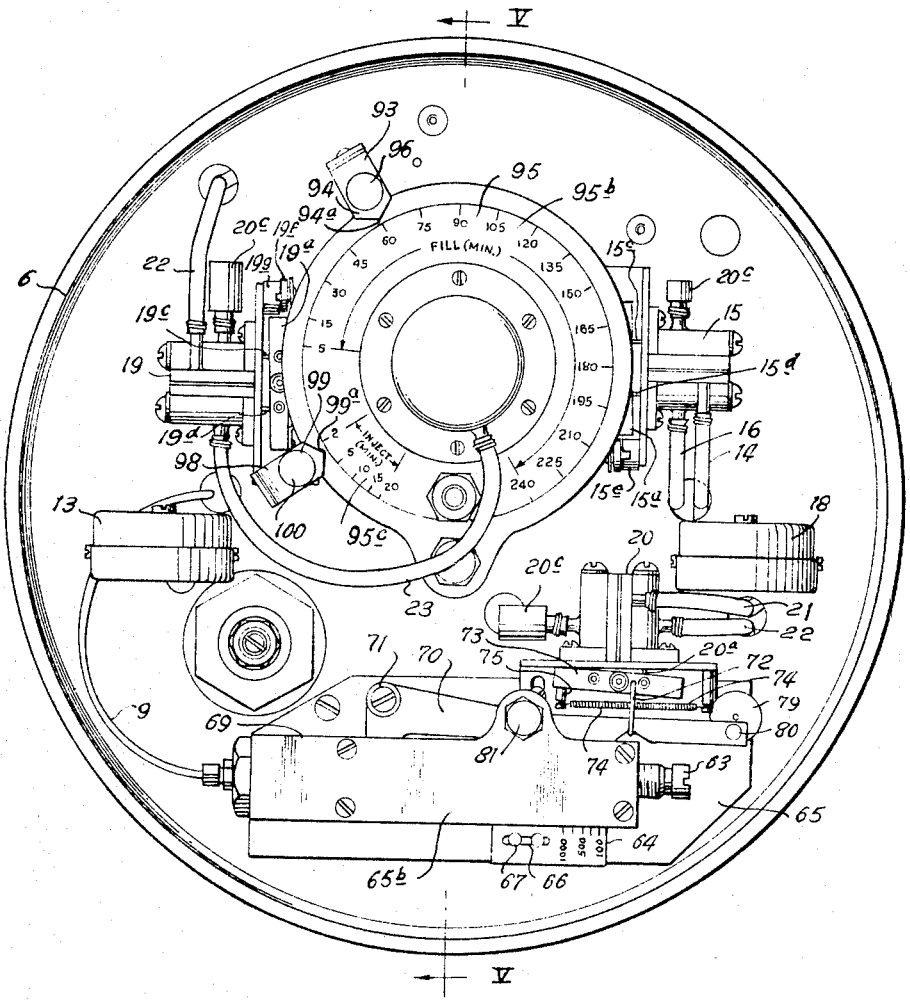

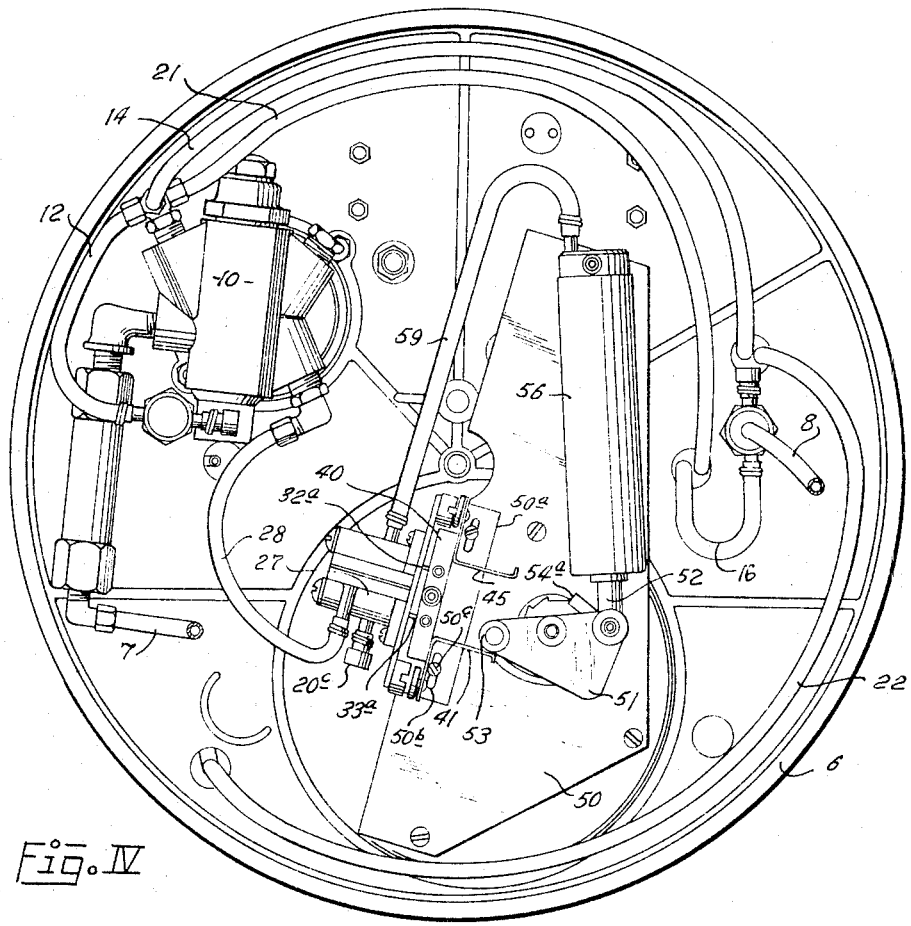
Fig. IV
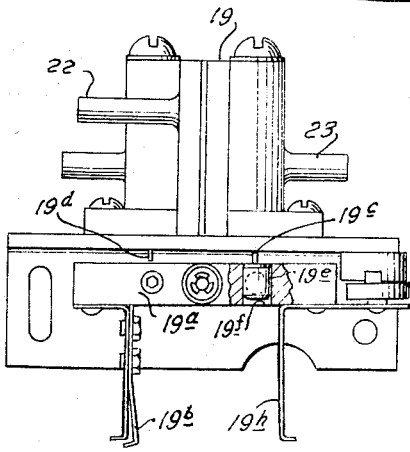
Fig. VII
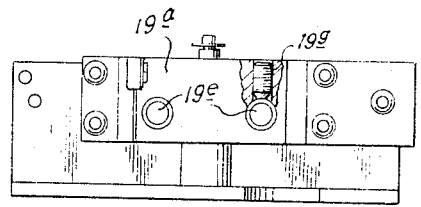
Fig. VIII
INVENTORS
Fred K. Storm
Eldridge H. Smiley
BY Howard E. Moore
ATTORNEY Oct. 4, 1966 F. K. STORM ETAL 3,276,469
CONTROLLER FOR USE IN GAS LIFTING FLUID FROM WELLS
Filed Jan. 30, 1964 6 Sheets-Sheet 4
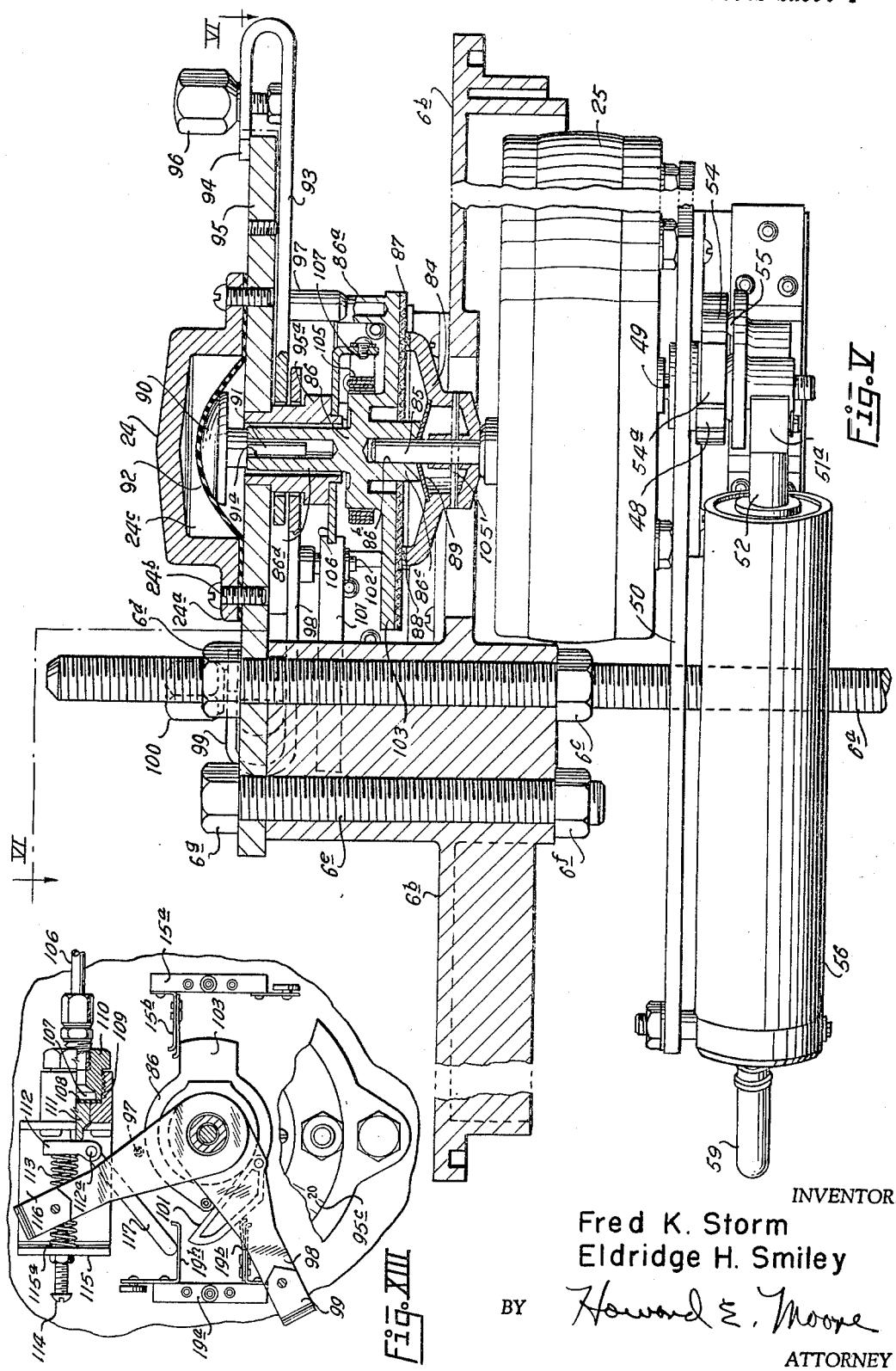
INVENTORS
Fred K. Storm
Eldridge H. Smiley
BY Howard E. Moore
ATTORNEY

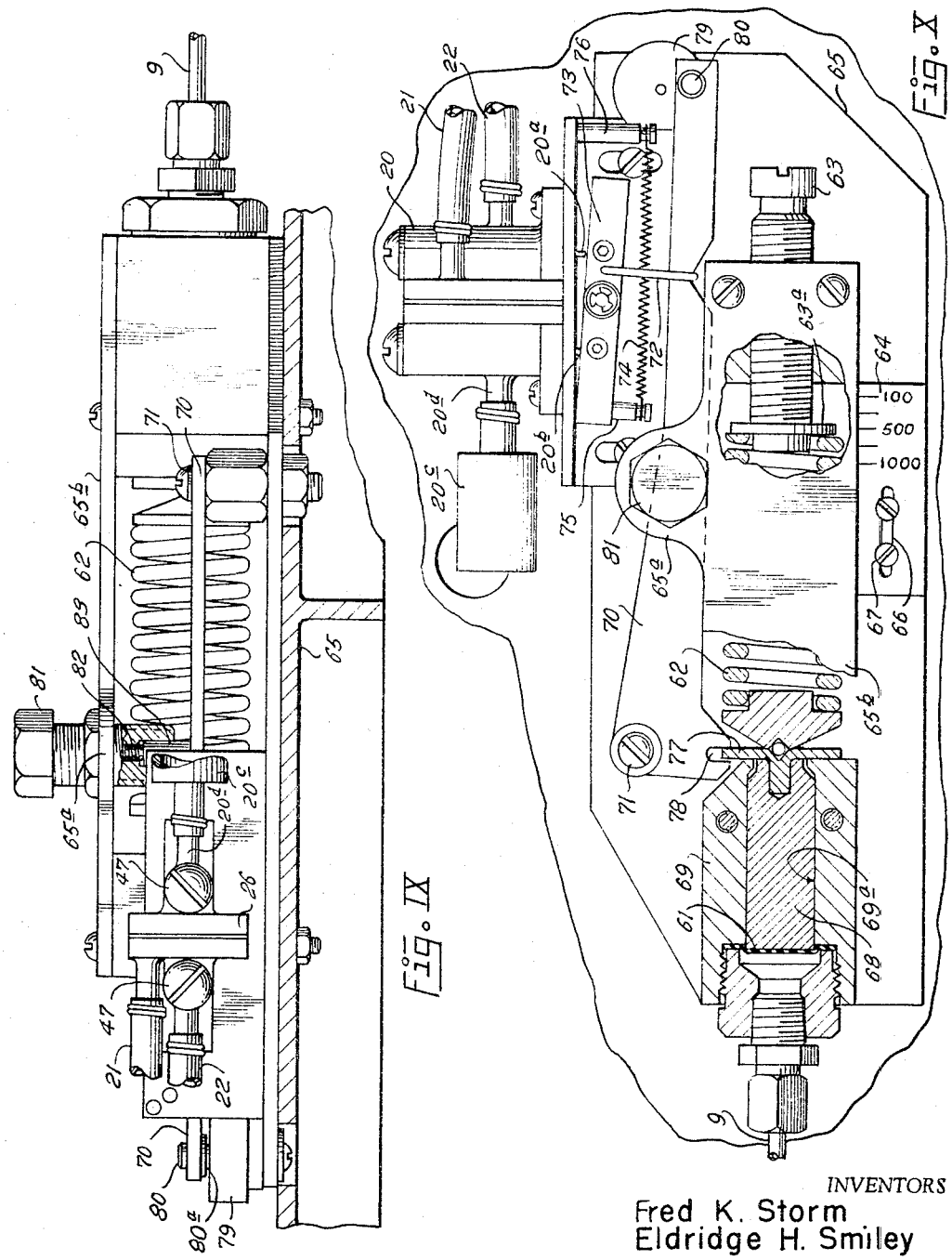

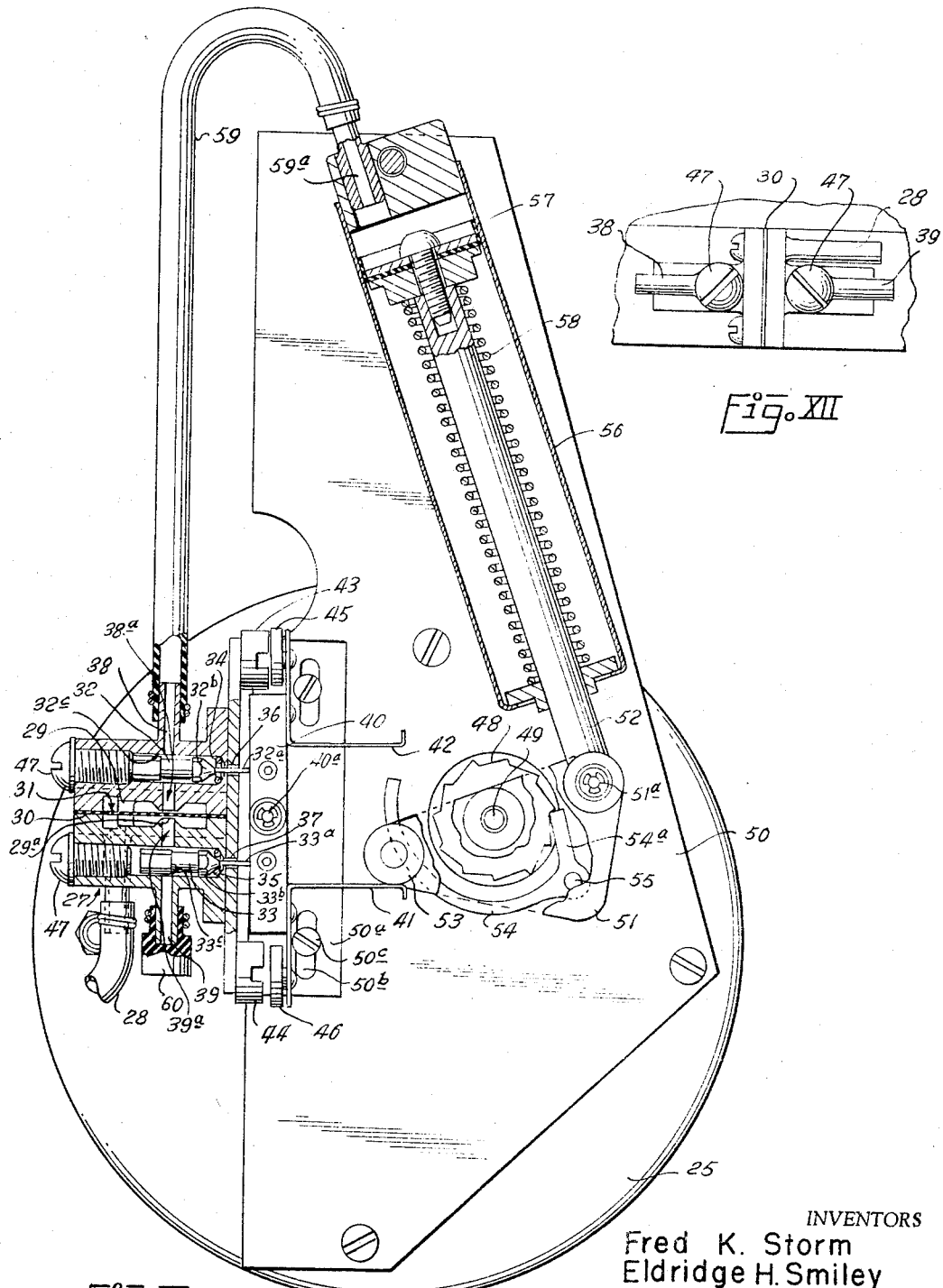

3,276,469
CONTROLLER FOR USE IN GAS LIFTING FLUID FROM WELLS
Fred K. Storm and Eldridge H. Smiley, Los Angeles, Calif., assignors to Dresser Industries, Inc., Dallas County, Tex., a corporation of Delaware
Filed Jan. 30, 1964, Ser. No. 341,375
13 Claims. (Cl. 137—495)

This invention is concerned with gas lifting fluid from oil and/or gas wells, and is particularly concerned with mechanism for intermittently injecting gas or other fluid under pressure into a well pipe for the purpose of supplying pressure fluid for the operation of gas lift valves mounted in communication with a conduit in a well.

Various types of time and pressure operated mechanisms have been provided in the past for intermittently injecting pressure fluid into oil wells for gas lifting operations, all of which were unduly complicated in setting, operation and repair, occupied an excessively large space, and required an unduly great number of parts, multiplying the chances of failure, and being unduly difficult to service and repair.

A primary object of the present invention is to provide a relatively simple, compact time and pressure control mechanism for injecting fluid under pressure into a well pipe, which is simple to operate and set, and relatively simple to repair.

Another object of the invention is to provide a self-contained time and pressure controlled intermitter having a minimum number of parts and requiring a minimum amount of adjustment and attention.

A still further object of the invention is to provide a time and pressure controlled intermitter wherein the injection and filling cycles may be quickly and easily set on a common indicator dial by simply rotating two arms thereabout and setting same in the desired position, and the cycles of filling and injection will be automatically repeated after setting without further attention by the operator.

Another object of the invention is to provide a time and pressure controlled intermitter for injection of fluid under pressure into a well pipe including a clock mechanism thereon which is automatically wound by gas pressure.

Still another object of the invention is to provide a time and pressure controlled intermitter for injection of gas into a well pipe wherein the cyling cam which controls the opening and closing of the motor valve, allowing gas to flow into the well pipe, is automatically reset after each cycle of operation, so that the device will be permitted to go through another cycle of operation.

A still further object of the invention is to provide a time and pressure controlled intermitter wherein the injection cycle is controlled both by time and maximum pressure build-up in the well pipe.

Another object of the invention is to provide a time and pressure controlled intermitter which is controlled by gas pressure and employs identical control valve construction for engaging the timing clutch, for pressure cut-off, for winding the clock, and for timing, thereby providing for easy interchangeability of parts, and simplicity of repair and adjustment.

Other and further objects of the invention will become apparent upon reading the detailed specification hereinafter following, and by referring to the drawings annexed hereto.

A suitable embodiment of the invention is shown in the attached drawings, wherein:

FIGURE I is a side elevational view of the intermitter device as it would be attached in association with a motor valve controlling injection of gas into a well pipe extending into a well bore;

FIGURE II is a diagrammatic view of the top of the intermitter device, depicting a flow diagram of gas to and through the various components thereof;

FIGURE III is a top plan view of the intermitter device as it actually apears;

FIGURE IV is a bottom plan view of the intermitter device showing the automatic clock winding cylinder and ratchet assembly;

FIGURE V is a cross-sectional, elevational view of the pressure operated clutch and cam assembly which controls the cycles of injection, depending upon the setting of the cams, as will be hereinafter explained;

FIGURE VI is a cut-away plan view showing the cam setting arms and cams for adjusting the timed cycles of injection of gas into the well pipe;

FIGURE VII is a top plan view of a typical valve block and armature assembly;

FIGURE VIII is a side elevational view of a typical valve block and armature assembly;

FIGURE IX is a partially sectionalized, side elevational view of the pressure regulating mechanism for initiating the cutting off of gas injection in response to a certain maximum or minimum pressure present in the well pipe;

FIGURE X is a partially sectionalized, top plan view of the pressure regulating mechanism;

FIGURE XI is a partially sectionalized plan view of the automatic clock winding mechanism;

FIGURE XII is a fragmentary top view of a typical valve block; and

FIGURE XIII is a fragmentary top plan view of a modified form wherein mechanism is provided for automatically shutting off the controller in response to a predetermined maximum tubing pressure.

Numeral references are employed to indicate the various parts shown in the drawings, and like numerals indicate like parts throughout the various figures of the drawings.

Referring first to FIGURE I, the well casing 1 extends into a well bore drilled into the earth's surface, and is surmounted by a well head 2.

A gas inlet line 3 communicates through the well head 2 with the well casing 1, and has incorporated therein a conventional motor valve 4, which controls the flow of gas under pressure into the well casing through the inlet line 3.

A motor valve 4, for purpose of description herein, will be assumed to be a normally closed motor valve, which is opened by pressure being applied to the upper surface of a diaphragm mounted in the diaphragm chamber 5.

The time and pressure controller mechanism, hereinafter described, is mounted in a separable housing or cover 6 which is secured to the upper surface of the diaphragm chamber 5 by means of a threaded stud 6a.

Gas under pressure for operating the controller device hereinafter described, is supplied through a supply line 7 which communicates with the gas inlet line 3 at the inlet side of the motor valve 4 and with the pressure regulator within the housing 6, as will be hereinafter described.

A gas pressure supply line 8 supplies pressure gas to the upper side of the diaphragm in the motor valve diaphragm chamber 5.

A gas pressure line 9 communicates with the casing 1 and the pressure regulator mechanism inside the controller housing 6, to cause the discontinuance of gas injection, in the manner hereinafter described, upon a maximum pressure being reached in the casing 1.

The stud 6a (FIGURE V) extends through the mounting plate 6b and is secured thereto by the nuts 6c and 6d, the nut 6d being threaded down against the indicator disc 95. The indicator disc is also secured to mounting plate 6b by a stud 6e which is attached thereto by nuts 6f and 6g.

Referring to the flow diagram of FIGURE II, the flow of gas will be traced through the controller, for controlling the various components therein, prior to a detailed description of the various component parts.

Gas under pressure, supplied through the supply line 7, passes through the regulator 10 where the pressure is lowered to a desired operating value. Such lowered pressure is fed through the cross connection 11 and line 12 to a gauge 13, so that the regulated pressure may be visually indicated.

A pressure line 14 communicates with the valve block 15 through which the motor valve 4 is controlled in the manner hereinafter described.

The outlet pressure from the valve block 15, when the valve is actuated to cause communication with line 14, is conveyed through outlet pressure line 16, pressure gauge 18, and cross connection 17 to line 8, which in turn communicates with the top side of the diaphragm in the diaphragm chamber 5, to thereby press the diaphragm downwardly and open the motor valve 4, to allow the injection of gas under pressure into the casing 1 through the inlet line 3.

A line 21 conveys regulated pressure to the pressure controlled valve block 20 and therethrough to line 22 to valve block 19, which controls the application of pressure through line 23 to the upper side of the diaphragm 92 in FIGURE V within cover 24, which controls engagement of the timer cam 86 with the clock mechanism 25 and thereby initiation of a timing cycle.

The pressure line 9 which communicates with the casing 1 also communicates with the pressure regulator mechanism 26, which is actuated by gas pressure to bleed off the pressure to valve block 19 and thereby disconnect the timer cam from the clock in the manner hereinafter described.

Pressure gas is also supplied from the outlet side of the pressure regulator 10 through an appropriate line 28 (FIGURE IV) to the valve block 27 which controls the admission of gas to the cylinder 56 of the automatic clock winding assembly (FIGURE XI).

A typical valve block construction is shown in detail in the cross sectional, elevational view of FIGURE XI and indicated generally by the numeral 27.

Supply gas is conveyed from the low pressure side of the pressure regulator 10 through a supply line 28, and conveyed through the wall of the body of the valve block into a cavity 29 which is divided by a flexible diaphragm 30.

A hole 31 is provided through the flexible diaphragm 30, allowing communication with the cavity 29 on each side of the diaphragm.

The movable poppets 32 and 33 are mounted in bores 32c and 33c, which are intersected by transverse pressure passages 39, 39a and 38 and 38a. The pressure passages 39a and 38a are terminated at their inner ends at a restricted area 29a of cavity 29.

The poppets 32 and 33 have contact stems 32a and 33a, extending downwardly from conical heads 32b and 33b. The contact stems 32a and 33a extend through openings 36 and 37 provided through the lower wall of the valve block. The openings 36 and 37 provide bleed passages for the purpose hereinafter mentioned.

Seal rings 34 and 35 are provided in the lower ends of the bores 32c and 33c, and the conical heads 32b and 33b are arranged to seat and seal on said seal rings.

The armature arm 40 is pivotally mounted on the plate 50a by the pivot pin 40a so that the said armature arm may rock back and forth about the pivot point 40a. The plate 50a is adjustable laterally by means of elongated slots 50b movable along screws 50c threadedly engaged in said slots.

Spaced spring-like contact arms 41 and 42 are secured to the outer surface of the armature arm 40 adjacent each end thereof.

Magnets 43 and 44 are mounted on the lower surface of the plate 50a, and lugs 45 and 46, made of magnetic material, are secured to the inner sides of outward extensions on the contact arms 41 and 42, so that the magnets 43 and 44 have a tendency to attract the lugs 45 and 46 thereto with a snap action when placed in close proximity thereto by mechanical means hereinafter mentioned.

As shown in FIGURE XI, the armature arm 40 has contacted the contact stem 32a, and pushed the poppet 32 upwardly, thereby allowing pressure to escape through the bleed passage 36, causing pressure to build up on the left side of the diaphragm 30, press same against the inner end of the passage 38a, and close same. Upon the armature arm being pivoted in the opposite direction to press upward on the contact stem 33a and raise the poppet 33, and release the poppet 32, the pressure is allowed to bleed off through the passage 37 and to build up on the right side of the diaphragm and through the passage 38 and behind the piston 57 for the purposes hereinafter mentioned.

Adjustment pins, such as indicated at 19e in FIGURES VII and VIII, are adjustable inwardly and outwardly of bores 19f in the armatures (19a, 73, 15a, and 40) and are held in adjusted position by set screws 19g, thereby allowing adjustment of spacing between the poppet pins and the pins 19e.

All of the valve blocks 15, 19 and 20, hereinafter mentioned, are constructed exactly in the same way and operate and function in the same manner, the only difference being in the specific means of actuating the armatures 40, 15a, 19a and 73, which will be specifically described.

The screws 47 (FIGURE XI) are threadedly engaged in the bores 32c and 33c for the purpose of retaining the poppets 32 and 33 therein.

The automatic block-winding mechanism is shown in FIGURE XI, wherein a ratchet wheel 48 is secured to the winding stem 49 of the clock 25. A ratchet plate 51 is pivotally attached about the clock stem 49. The one end of the ratchet plate 51 is pivotally attached, as indicated at 51a, to the outer end of the piston stem 52, and a roller 53 is attached to the opposite end of the plate 51.

A pawl 54 is pivotally attached at 55 to the ratchet plate 51, and the pawl includes a lateral arm 54a engageable with the teeth on the ratchet wheel 48, which allows the ratchet wheel 48 to rotate in a counter-clockwise direction but not in a clockwise direction.

The cylinder 56 has a piston 57 slidably disposed therein, which is secured to the piston rod 52.

A spring 58 is disposed about the piston rod 52 and is engaged between the end of the cylinder 56 and the piston 57, so as to urge the piston 57 inwardly of the cylinder 56.

The pressure in line 59 is attached to and communicates with the pressure passage 38 in valve block 27, and communicates at its other end with the interior of the cylinder 56 above the piston 57, through the passage 59a.

It will be noted that the spring 58 exerts a pushing force on the stem 52 inwardly of the cylinder 56, which in turn tends to rotate the ratchet wheel 48 in a counter-clockwise direction through the pawl 54 attached to the plate 51.

If the torque of the spring in the clock exerts less torque on the stem 49 than the force exerted by the spring 58, then the spring 58 moves the rod 52 and piston 57 inwardly of the cylinder 56, rotates the plate 51 in a counter-clockwise direction, exerts a lateral force on the spring 41 through the roller 53, thereby rotating the armature 40 in a clockwise direction, exerting upward force against the stem 33a of poppet 33, lifting the head 33b off the seal 35, allowing pressure in the bore 33c to bleed through the passage 37. This allows pressure to be built up in the chamber 29 on the right side of the diaphragm 30 to move the diaphragm against the inner end of the passage 39a, moving the head 32b into sealing engagement with the seal 34, closing the passage 36, and allowing pressure fluid to pass through the passage 38, and pressure line 59 into the cylinder 56 above the piston 57. As pressure is applied through line 59 to the upper side of the piston 57, such pressure forces the piston downwardly in the cylinder 56, rotating the plate 51 in a clockwise direction, to cause the roller 53 to contact the spring 42, rotate the armature 40 in a counter-clockwise direction, push the poppet 32b upwardly and allow pressure to bleed off through the passage 36 and therefore bleed off the pressure above the piston 57.

When the pressure on the top of the piston 57 is thus bled off, the spring 58 exerts a torque on the clock stem 49 until the spring 58 and the spring in the clock are balanced, thus affording a static condition. As the clock runs, the main spring therein will relieve some of the torque exerted thereby which will create a situation of imbalance, allowing the spring 58 to again rotate the ratchet wheel 48 and stem 49 to wind the clock spring in the manner which has been hereinbefore described. This cycle is automtically repeated to thereby keep the clock spring wound. It will be noted that in the valve block 27, the passage 39 is closed by a plug 60 inasmuch as this passage is not employed for exerting pressure in the clock winding mechanism.

In FIGURES IX and X there is shown the details of the pressure regulating mechanism which is actuated by a predetermined maximum pressure built up in the well casing to automatically stop the injection of gas into the casing.

As shown, the regulating pressure from the casing enters the regulating device through the line 9 and acts against a flexible diaphragm 61 which force is opposed by a spring 62, the force of which may be adjusted by an adjusting screw 63. The extent of adjustment of the spring 62 is indicated by an indicator plate 64 movable with the screw 63, said plate being slidably and adjustably attached to the mounting plate 65 by screws 67 threadedly engaged in the plate 65 through an elongated slot 66 which is slidable with relation to the screws 67. The scale division lines may be lined up with flange 63a on screw 63 to indicate extent of adjustment.

The spring 62 is normally set to urge the plunger 68 inwardly of the bore 69a in block 69 so as to stretch the diaphragm 61 inwardly as shown in FIGURE X. However, if the pressure exerted through the line 9 is greater than the force exerted by the spring 62, the plunger 68 is moved outwardly of the bore 69a to thereby move the plate 77 to the right in FIGURE X. The plate 77 is engaged in a slot 78 provided in the downwardly extending portion of the pivoted arm 70. The arm 70 is pivotally attached to the mounting plate 65 by the pivot pin 71.

A link 72 is attached to the armature arm 73 and is loosely extended about arm 70 and is arranged to exert a downward force on the pivoted armature arm 73 when the arm 70 is rotated clockwise by pressure exerted thereto through the plate 77 by spring 62.

The spring 74 is extended between a post 75 attached to the end of the armature arm 73 and a post 76 attached to the bottom of the valve block 20. The spring 74 is arranged to exert a force to cause the armature 73 to have a tendency to rotate in a counterclockwise direction.

It will be seen that increased pressure in line 9 moves the diaphragm 61 and plunger 68 to the right. It will thereby move the plate 77 to the right, and rotate the arm 70 to allow the right end of armature 73 to move upwardly by spring 74 and thereby push in on the poppet 20a allowing relief of pressure from the cylinder in which the poppet is disposed, as hereinbefore described, and thereby allowing pressure to be applied to the line 22 to be relieved.

If the regulating pressure through line 9 exerts a force less than that of the spring 62, the arm 70 is rotated in the opposite direction which exerts force through link 72 on the armature 73 and overcomes the spring to rotate the armature 73 in a direction to press the poppet 20b inwardly to relieve the pressure therefrom. Poppet 20a is then allowed to close to thereby again build up pressure in line 22 for the purposes hereinafter mentioned in connection with the description of operation.

A volume chamber 20c is secured to a passage 20d communicating with the cavity 29 inside the valve body 20 for the purpose of leveling out the change in pressure between opposite sides of the diaphragm therein. Such volume chambers are employed with the valve blocks 15, 19 and 20.

A latch plate 79 is attached to the base plate 65. A pin 80 is secured to the outer end of the arm 70, and there is attached to the bottom of the pin 80 a spring-urged ball 80a, which is arranged to snap out of a hole in the plate 79 to provide for a snap action of the armature 73 in a direction which would press in on the poppet pin 20b, to provide for bleeding pressure through the passage about the poppet pin.

A screw 81 is threadedly engaged with an extension 65a of the mounting plate 65b for the pressure regulating mechanism, and is threaded downwardly against a spring 82, which is abutted against a friction pad 83. By threading the screw 81 downwardly, force may be applied to the spring 82 which is exerted against the friction pad 83. The friction thus created between the friction pad 83 and the arm 70 creates a drag, which provides for a spread or difference between the pressure which actuates the arm 70 in one direction as opposed to the drop in pressure which actuates the arm 70 in the opposite direction.

The timing mechanism for setting the time between the cycles of gas injection and also the time of injection is shown in FIGURES III, VI and V.

The clutch plate 84 is secured to a pin 85. The pin 85 is attached to, and rotatable by a shaft (not shown) within the clock 25, which shaft is rotated by the clock spring. The cam plate 86 has a bore 86b provided therein into which the pin 85 extends and is rotatable therein.

A clutch pad 87, made of suitable frictional material, is secured to the bottom surface of the cam 86, and a clutch ring 88, made of suitable frictional material, is secured to the upper edge of the clutch plate 84, so that when the clutch plate 87 and clutch ring 88 are pressed together in the manner hereinafter described, the cam plate 86 will be rotatable with the clutch plate 84.

The flat spring 89 is disposed about the pin 85 and is engaged at its outer edge by the inner surface of the clutch plate 84 and at its upper edge by a cylindrical downward extension 86c on the cam plate 86. The spring 89 is arranged to normally urge the cam plate 86 and clutch plate 84 apart so that when downward pressure is relieved from the cam plate 86, the spring 89 will push the friction pads 87 and 88 apart so that the cam plate 86 is no longer rotated with the clutch plate 84 by the clock 25.

The pressure head or plate 90, having a rounded upper surface, has a stem 91 extending into the bore 91a provided in a cylindrical extension 86d on the cam plate 86.

A flexible diaphragm 92 extends over the upper surface of the head 90 and is clamped at its outer edge between an outwardly extending flange 24a on the cover 24 by means of screws 24b. There is thus provided a chamber 24c above the diaphragm 92 with which chamber the pressure line 23 communicates for the purpose which will be hereinafter described in connection with the operation of the device.

Upon the admission of pressure into the chamber 24c, the diaphragm 92 is pushed downwardly, thereby pushing the cam plate 86 downwardly pressing the friction pads 87 and 88 together in tight frictional engagement so that the cam plate 86 is caused to rotate with the clutch plate 84 as it is rotated by the clock mechanism. If there is no pressure exerted on the upper surface of the diaphragm 92, the spring 89 pushes the cam plate 86 upwardly, disengaging the clutch plate 84 from the cam plate 86 so that the cam plate does not rotate with the clutch plate and the clock stem.

The cycling lever 93 is rotatably attached about a bushing 95a which is secured to the injection and cycling indicator disc 95. The injection and cycling indicator disc 95 has indicator numerals 95b thereon to indicate filling cycle in minutes and indicia 95c thereon to indicate injection time in minutes. The cycling lever 93 has a turnback portion 94 thereon slidable about the outer edge of the indicator disc 95 and has a pointer 94a on the outer end thereof which may be aligned with a selected minute indicia to indicate the filling cycle time and has a set screw 96 thereon which may be tightened downwardly against discs 95 to maintain same in such set position.

A pin 97 is secured to, and extends downwardly from, the lower edge of the cycling lever 93, such pin being engageable with a pin 86a extending upwardly from the cam plate 86, so that when pressure is released from the chamber 24c and the cam plate 86 is disengaged from the clutch plate 84, and the cam plate is rotated in a clockwise direction by the force of the spring 105, the pin 86a engages and is stopped by the pin 97 to automatically set the time of the next fill cycle.

The spring 105 is disposed about the cam plate 86 and has one end thereof attached to the cam plate and the other end thereof attached to the plate 106 by means of screw 107, said plate 106 being secured to the fixed bushing 95a, so that upon rotation of the cam plate 86 in a counter-clockwise direction, the spring 105 is contracted, building up force therein, and when the cam plate 86 is released from engagement with the clutch plate 84, the spring will automatically relax and rotate the cam plate 86 in a clockwise direction until the pin 86a strikes the pin 97 and stops the counter rotation thereof.

An injection cycle setting arm 98 is rotatably disposed about the fixed bushing 95a and has a turned back end 99 engaging the outer edge of the indicator plate 95, and has a pointer 99a thereon which may be aligned with a desired injection time numeral 95c on the indicator plate 95 and also has a set screw 100 thereon by which the injection cycle setting arm 98 may be fixed in place.

The cam 101 is pivotally attached at one end by a pivot pin 102 to the injection setting arm 98 (FIGURE VI). The cam 101 is arranged to be engaged by the pin 86a as it is rotated by the clock 25 in a counter-clockwise direction as shown in FIGURE VI, to thus push the rounded side of the cam 101 against the spring arm 19b of the armature 19a for the purpose which will be described in connection with the operation of the device hereinafter. It will be seen that by moving the arm 98 in a clockwise direction and setting same in fixed position, as shown in FIGURES III and VI, the pin 86a will engage the cam 101 sooner and press it against the spring 19b to actuate the armature 19a for discontinuing application of pressure to the chamber 24c and stopping injection, as will be hereinafter described.

A lobe 103 is provided on the opposite side of the cam plate 86 from the pin 86a, the centerline of same being aligned with the axis of the pin 86a. The position of the lobe 103 is set at the time the cycling period is set by movement of the arm 93, and when same is rotated by the clock in a counter-clockwise direction, it will engage the spring arm 15b of the armature 15a to actuate the armature to operate the poppets in the valve block 15 in a manner to apply pressure through line 8 (FIGURE I) to the top of the diaphragm in the motor valve 5 to open same and allow injection of gas into the casing.

As previously explained, the time of injection is determined by the engagement of the pin 86a with the cam 101 to move the cam against spring 19b.

The operation and function of the mechanism hereinbefore described is as follows:

By way of example, as shown in FIGURE III, with the cycling lever 93 set for 60 minutes to determine the interval between gas injections into the casing, and the injection lever 98 set on three minutes, which is the time interval of injection of gas into the casing, the following cycle of operation will occur.

With the motor valve 4 closed the maximum pressure has been built up in the casing 1, and the regulator mechanism has bled off the pressure in the line 22, which is the supply line for the valve block 19. If there is no supply pressure to valve 19, then there is no pressure in line 23 which goes to the chamber 24c above the timer actuating diaphragm 92. Inasmuch as there is no pressure above diaphragm 92, the pressure head 90 has no force applied thereto to push down the cam plate 86 to cause engagement between the clutch pads 87 and 88 to rotate the cam plate 86 with clutch plate 84, as the clock rotates clutch plate 84.

The clutch plate 84 is connected to the clock stem and turns with the clock, but inasmuch as the timer cam plate 86 is not pressed into engagement therewith, the cam plate 86 is not rotating and therefore the device is not timing.

When the down-hole flow valve in the well opens, it injects gas into the tubing, and the pressure in the casing begins to drop. As the pressure in line 9 drops, the spring 62 in the regulator mechanism overcomes the diaphragm 61 therein, rotates the lever arm 70, allowing rotation of the armature arm 73 clockwise and permitting poppet 20a to close and cause poppet 22b to open, thereby allowing pressure to build up behind poppet 20a and apply same to line 22, and through valve block 19 and line 23, to the upper side of the diaphragm 92. Pressure on top of the diaphragm 92 pushes the timer cam plate 86 downwardly into contact with the clutch plate 84, through the clutch pads 87 and 88, to cause the timer cam 86 to rotate with the clutch plate 84.

Inasmuch as the fill lever 93 is set for 60 minutes, upon the expiration of 60 minutes the timer cam 86 will have turned to a position so that the lobe 103 will contact the spring 15b on the armature 15a and pivot the upper end of the armature inwardly (FIGURE II) to overcome the magnet 15e, thereby releasing the poppet 15d and pushing poppet 15c inwardly to thereby allow poppet 15d to close and apply pressure through lines 16 and 8 to the upper side of the diaphragm in the diaphragm housing 5 to thereby open the motor valve 4 and allow injection of gas into the casing.

The injection lever 98 is set for three minutes, which means that the pin 86a on the timer cam 86 will continue to rotate with the timer cam plate until it engages the cam 101 and forces it against the spring arm 19b, thereby pivoting the armature 19a inwardly to cause the armature to press against the poppet 19d and open same to allow the pressure to bleed off from the line 23, thereby bleeding off the pressure from the upper side of the diaphragm 92, allowing the spring 89 to push the cam plate 86 out of engagement with the clutch plate 84. This allows the cycling spring 105 to counter-rotate the cam plate 86 until the pin 86a thereon contacts the pin 97 on the cycling lever 93, thereby stopping same and setting up another cycle of operation. The counter rotation of the cam plate 86 disengages the lobe 103 from the spring arm 15b, allowing the magnet 15e to attract the other end of the armature 15a thereto, pressing in on poppet 15d, allowing pressure to bleed off of pressure lines 16 and 8, thereby relieving pressure from the upper side of the diaphragm in the motor valve 4, to permit the motor valve to close thereby discontinuing injection of gas into the casing.

If the maximum desired casing pressure has been reached before the 3-minute injection cycle has been completed, the regulator mechanism will be actuated in the manner hereinbefore described, by bleeding off the pressure in line 22 through valve block 19 from line 23, thus releasing pressure from the upper side of the diaphragm 92 and allowing the cam plate 86 to be released and counter-rotated to release pressure of lobe 103 from spring arm 15d to bleed off pressure to the upper side of the motor valve diaphragm, in the manner hereinbefore described.

The clock winding mechanism is operative at all times to keep the clock automatically wound, the operation and function of which has already been described, so that further description is unnecessary.

In FIGURE XIII there is shown a modified form wherein mechanism is provided for shutting off the controller in response to a predetermined maximum pressure rise in the tubing string extending into the well.

It may occur that a well operating intermittently on a time cycle injection control with maximum casing pressure shut off may start flowing of its own volition. If the well starts flowing on its own, it is not desired to inject any more gas into the casing annulus through the controller. As the well flows of its own volition, the tubing pressure will increase and the mechanism hereinafter described will shut off the controller when a predetermined maximum pressure is reached in the tubing.

Referring to FIGURE XIII, a line 106 is connected in communication with the tubing string and conveys pressure from the tubing string to the chamber 107. Pressure build-up in the chamber 107 exerts pressure against the diaphragm 108 which is clamped between the housing 109 and the retainer nut 110, which is threadedly engaged with the housing. The force exerted by the pressure on the diaphragm 108 is transmitted to the piston 111, which in turn exerts a force on the relay arm 112, which is pivotally mounted at 112a to the mounting bracket 116.

The spring 113 is positioned between the relay arm 112 and the spring retainer 115 carried by the bracket 116, and the tension of the spring 113 may be adjusted by a screw 114 which carries a spring retainer 115a thereon. Spring 113 exerts a force on relay arm 112 opposite the force supplied through piston 111. The spring 113 tends to rotate the relay arm 112 in a clockwise direction while force exerted through piston 111 tends to rotate the relay arm 112 in a counter-clockwise direction.

When the tubing pressure rises to a pre-determined maximum, same exerts a force through piston 111 greater than that exerted by the spring 113, relay arm 112 is rotated in a counter-clockwise direction thereby rotating the arm 117 in a counter-clockwise direction, which exerts a force on spring arm 19h to rotate the armature arm 19a in a clockwise direction to thereby press down upon the poppet 19d to allow pressure to bleed off of the line 23, relieve pressure on the diaphragm 92, and thereby permit the timer cam 86 to separate from the clutch plate 84 and stop the controller, and thereby discontinue the injection of gas into the casing annulus.

When the tubing pressure drops below the pre-determined maximum, and thereby exerts a force less than the force of the spring 113, the relay arm 112 is caused to rotate in a clockwise direction and allows the armature 19a to rotate counter-clockwise by reason of the attraction of the member 19f to the magnet 19g, thus pressing in on poppet 19c allowing poppet 19d to move outwardly and close the passage through the base of the valve block member 19, and again permit pressure fluid to be applied through line 23 to the upper side of the diaphragm 92, to again begin the timing cycle in normal manner as hereinbefore described.

What is claimed is:

1. In a device for opening and closing a motor valve controlling flow of fluid under pressure into a well casing having a well tubing extending thereinto; a clock including a spring driven shaft; a clutch plate attached to the shaft and being rotatable therewith; a cam plate engageable with the clutch plate; spring means normally urging the cam plate away from the clutch plate; a pressure responsive member arranged to apply downward force on the cam plate when pressure is exerted against the upper side thereof; means to apply fluid under pressure on the upper side of the pressure responsive member to move the cam plate into engagement with the clutch plate whereby the clock will rotate the cam plate; a filler and injection cycle indicator plate having graduations thereon to indicate time between cycles of injection and graduations thereon to indicate gas injection time; a filler time indicator arm rotatable about the cam plate and having means thereon arranged to be adjustably slidable along the filler indicator section of the indicator plate and being attachable thereto in adjusted position; stop means on the filler time indicator arm engageable with stop means on the cam plate to limit reverse rotation of the cam plate; spring means arranged to rotate the cam plate in reverse direction when released from the clutch plate; an injection cycle indicator arm rotatable about the cam plate and having a part adjustably movable along the injection cycle indicator scale and being attachable thereto in adjusted position; first valve means controlling admission of gas under pressure to the upper side of the pressure responsive member; a pressure gas supply line supplying gas under pressure to the first valve means; means on the injection cycle indicator arm engageable with the stop means on the cam plate and movable by said stop means into engagement with the first valve means to actuate the valve means to discontinue admission of gas under pressure to the upper side of the pressure responsive member; second valve means controlling admission of fluid under pressure to a diaphragm of the motor valve to thereby control the opening and closing of the motor valve; means on the cam plate engageable with the second valve means to open same and allow application of gas under pressure to the diaphragm of the motor valve.

2. The combination called for in claim 1 with the addition of third valve means in the pressure gas supply line to the first valve means; and means responsive to a pre-determined pressure in the well casing to move the third valve to a closed position to discontinue the supply of gas under pressure to the first valve means to thereby discontinue the supply of gas under pressure to the upper side of the pressure responsive member to cause the disengagement of the cam plate from the clutch plate, the reverse rotation of the cam plate by the spring means to release the second valve and close same, and thereby discontinue the application of pressure fluid to the diaphragm of the motor valve.

3. The combination called for in claim 1 with the addition of means to automatically wind the clock including fourth valve means; means for supplying gas under pressure to the fourth valve means; a pressure cylinder supplied with fluid under pressure through the fourth valve means including a piston with a rod attached thereto extending from the piston; spring means within the cylinder normally urging the piston inwardly thereof; a ratchet wheel attached to the clock spring shaft; a pawl attached to the rod cooperating with the ratchet wheel to turn same in a direction to wind the clock spring by pressure exerted inwardly of the cylinder by the spring therein; and means responsive to a tension of the spring in the clock and the spring in the cylinder to alternately operate the valve means to supply or discontinue the supply of pressure fluid to the piston.

4. The combination called for in claim 1 wherein each valve means includes, a body, a chamber in said body; a flexible diaphragm dividing the chamber into two parts; a passage through the diaphragm permitting communication between the parts of the chamber; a bore in the body on each side of the diaphragm; a passage leading from each bore in communication with one of the parts of the chamber; a port through the wall of the body communicating with each bore; a poppet slidably disposed in each bore and having heads thereon arranged to close the ports; pin members extending through the ports and beyond the outer wall of the body; an armature pivotally attached to the body between the pin members whereby upon pivoting the armature the pin members will be depressed to push the heads away from the passages to allow same to open; an inlet and outlet passage communicating with separate chamber parts; the said diaphragm being arranged to close the passages causing communication between the parts of the chamber and the bores depending upon the flexure of same in response to pressure exerted thereagainst.

5. The combination called for in claim 1 with the addition of means responsive to a pre-determined maximum pressure in the well tubing to engage the first valve member to actuate same to discontinue admission of gas under pressure to the upper side of the pressure responsive member.

6. In a device for intermittently supplying fluid under pressure to a pressure responsive valve controlling flow of fluid under pressure into a well pipe, a clock; a control plate rotatable by the clock; disengageable clutch means between the clock and the control plate; pressure fluid actuated means to engage the clutch plate with the control plate; a pressure fluid supply conduit connected to the fluid actuated means; first valve means in the supply line controlling flow therethrough to the fluid actuated means; means adjustable about the control plate movable into engagement with the first valve means to close same and discontinue the supply of pressure fluid to the pressure fluid actuated means; means on the control plate engageable with the adjustable means to move same into engagement with the first valve means, a second pressure fluid supply conduit connected to the pressure responsive valve; second valve means in the second pressure fluid supply conduit; other means on the control plate engageable with the second valve means to open same and allow supply of pressure fluid to the pressure responsive valve to open same and allow injection of gas under pressure into the well pipe.

7. The combination called for in claim 6 with the addition of spring means operable upon release of the clutch means to counter-rotate the control plate to release the means thereon from contact with the first valve means and the second valve means to open the first valve means and close the second valve means; and means adjustable about the control plate engageable with the control plate to limit counter-rotation thereof.

8. The combination called for in claim 6 with the addition of third valve means in the first supply conduit; and means movable in response to a predetermined maximum pressure in the well pipe to engage the third valve means to close same and discontinue the supply of pressure fluid to the pressure fluid actuated means.

9. The combination called for in claim 6 with the addition of another pressure fluid actuated means operable to wind the clock.

10. The combination called for in claim 6 wherein the means adjustable about the control plate movable into engagement with the first valve means includes an arm movable arcuately about the control plate, and a cam pivotally attached to the arm and engageable by the means on the control plate to move same into engagement with the first valve means.

11. The combination called for claim 6 with the addition of an indicator disc having graduations of time thereon; and means on the adjustable means positionable on the indicator disc to indicate the time during which the fluid under pressure is supplied to the pressure responsive valve.

12. The combination called for in claim 6 with the addition of an indicator disc having graduations of time thereon; and means positionable on the indicator disc to indicate the time of no pressure fluid injection into the well pipe.

13. The combination called for in claim 6 with the addition of pressure responsive means engageable with the first valve means to close same to discontinue the supply of pressure fluid to the pressure fluid actuated means when the pressure responsive means is subjected to a predetermined maximum pressure.

References Cited by the Examiner

UNITED STATES PATENTS

| 2,106,094 | 1/1938 | Griffey et al. | 137—624.14 |
| 2,638,110 | 5/1953 | Parks | 137—155 |
| 2,919,716 | 1/1960 | Boyer | 137—636 |
| 2,935,090 | 5/1960 | Arnot | 137—636 |
| 3,002,526 | 10/1961 | Terral | 137—492.5 |
| 3,105,518 | 10/1963 | Kunz | 137—624.14 |
| 3,211,179 | 10/1965 | Lilly et al. | 137—624.14 |

M. CARY NELSON, *Primary Examiner.*

MARTIN P. SCHWADRON, *Examiner.*

R. J. MILLER, *Assistant Examiner.*